(12) United States Patent
Mathew et al.

(10) Patent No.: US 7,925,625 B2
(45) Date of Patent: Apr. 12, 2011

(54) SYNCHRONIZING DATA BETWEEN BUSINESS APPLICATIONS

(75) Inventors: Ashvin J Mathew, Kirkland, WA (US); Nicolae Surpatanu, London (GB); Hao Feng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 873 days.

(21) Appl. No.: 11/858,332

(22) Filed: Sep. 20, 2007

(65) Prior Publication Data

US 2009/0083088 A1 Mar. 26, 2009

(51) Int. Cl.
*G06F 17/30* (2006.01)

(52) U.S. Cl. ...................................... 707/610

(58) Field of Classification Search ............ 707/10, 707/204, 610; 715/203
See application file for complete search history.

(56) References Cited

U.S. PATENT DOCUMENTS

| | | | |
|---|---|---|---|
| 5,778,135 A * | 7/1998 | Ottesen et al. | 386/52 |
| 5,987,376 A | 11/1999 | Olson et al. | |
| 6,434,710 B1 * | 8/2002 | Sato et al. | 714/2 |
| 6,477,545 B1 * | 11/2002 | LaRue | 707/625 |
| 6,581,110 B1 * | 6/2003 | Harif et al. | 709/248 |
| 6,976,038 B2 | 12/2005 | Acree et al. | |
| 7,032,003 B1 | 4/2006 | Shi et al. | |
| 7,584,412 B1 * | 9/2009 | Raff | 715/203 |
| 2004/0205069 A1 * | 10/2004 | Ishizawa | 707/10 |
| 2005/0187993 A1 | 8/2005 | Selman et al. | |
| 2005/0267921 A1 * | 12/2005 | Bali et al. | 707/204 |
| 2006/0106859 A1 | 5/2006 | Eugene et al. | |
| 2006/0173930 A1 | 8/2006 | Soini et al. | |
| 2007/0067354 A1 | 3/2007 | Mullender et al. | |
| 2007/0073899 A1 | 3/2007 | Judge et al. | |
| 2007/0088764 A1 | 4/2007 | Yoon et al. | |
| 2008/0010497 A1 * | 1/2008 | Kronlund et al. | 714/6 |

FOREIGN PATENT DOCUMENTS

WO   WO2005036365 A2   4/2005

OTHER PUBLICATIONS

Italiano, et al., "Synchronization Options for Data Warehouse Designs", IEEE Computer Society, 2006, pp. 53-57.
Porto et al., "Persistent Object Synchronization with Active Relational Databases", 1999, IEEE Computer Society, pp. 10.
Little et al., "Multimedia Synchronization Protocols for Broadband Integrated Services", vol. 9, No. 9, 1991, IEEE, pp. 1368-1382.

* cited by examiner

*Primary Examiner* — Etienne P LeRoux (57) ABSTRACT

Architecture for synchronizing data between business applications according to a multi-master arrangement. Changes to business entities can be snapshot changes, delta changes, and long-running process changes, the latter which can be derived from the first two. The architecture includes automatic error retry logic, such that when synchronization errors occur, the logic can be replayed to resolve the errors, when conditions have changed where the errors can be resolved. This also applies to when one error causes a cascading set of errors. By replaying one error, the other errors will be resolved. Backup and restore of a participating application is also provided such that a new data change in a non-backup-restored application will automatically be synchronized to the recently-restored system.

19 Claims, 10 Drawing Sheets

SYNCHRONIZING DATA BETWEEN BUSINESS APPLICATIONS

BACKGROUND

Data in business applications with modern object oriented design are typically in the format of one or more business entities and current state information such as a point-of-sales (POS) application and an accounting application, for example. Both of these applications have the business object concepts of items, transactions, customers, etc. Eventually, these application objects need to be synchronized. With a greater need for directly synchronizing the data between business applications, the methods for synchronizing these data become more interesting. The core of such methods is to decide the problem model and come up with an algorithm to handle such business entity synchronization.

Business entities can be changed and it is the changes that need to be synchronized between the business applications once the entities in different systems are matched up. Changes can be categorized into one of three types according to the affect on the business entity. With respect to "snapshot" changes, only after-change results matter and are stored (e.g., a customer address change). Characteristics of "delta" changes are that both the before and after change information matters and both are stored. However, the change process itself virtually does not take any time. This resembles observing a database transaction from the outside; either there is no result or there is the final result of the transaction (e.g., an inventory asset value change resulting from an immediately settled cash sale transaction on an inventory item). "Long-running-process" changes can run hours, days, or even months. Thus, a synchronization process can occur at any stage of the process (e.g., an approval process for a special discount to a favored customer which may take several days and involve multiple people in an organization).

Depending on the business application domain and purpose, the application can include one or more of the above three change processes. Conventionally, these changes are imposed in the business system by a designated master among two or more business applications. This can be a problem where there may be an object inconsistency, since the master may not have the latest information, yet be declared the winner. Accordingly, when businesses grow, the number of business applications can grow, thereby creating objects at different locations that must be synchronized not only from the front office applications to back office applications, but also from back office applications to the front office applications.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a mechanism for synchronizing data between business applications according to a multi-master arrangement. Changes to business entities can be snapshot changes, delta changes, and long-running process changes, the latter which can be derived from the first two. By reducing the changes into three constituent parts any kind of conflict resolution that needs to happen can be easily understood by the user. Synchronization will be complete and correct, and if any conflicts exist, the conflict resolution is simple.

The architecture also includes automatic error retry logic, such that when synchronization errors occur, the logic can be replayed to resolve the errors, when conditions have changed where the errors can be resolved. This also applies to when one error causes a cascading set of errors. By replaying one error, the other errors will be resolved.

Backup and restore of a participating application is also provided such that a new data change in a non-backup-restored application will automatically be synchronized to the recently-restored system.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

The disclosed data synchronization architecture reduces data entity changes to snap-shot changes, delta changes, and long-running process changes for use in multi-master application environments. For example, in a business environment that employs one or more front-office applications such as point-of-sale (POS) applications and one or more back-office applications, data entity synchronization is full and complete, and the solving of conflicts is automatic, easy to implement, and user-friendly. Moreover, synchronization errors are logged and retried automatically for resolving when the error condition changes. The architecture also provides backup-and-restore for participating applications.

Reference is now made to the drawings, wherein like reference numerals are used to refer to like elements throughout.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
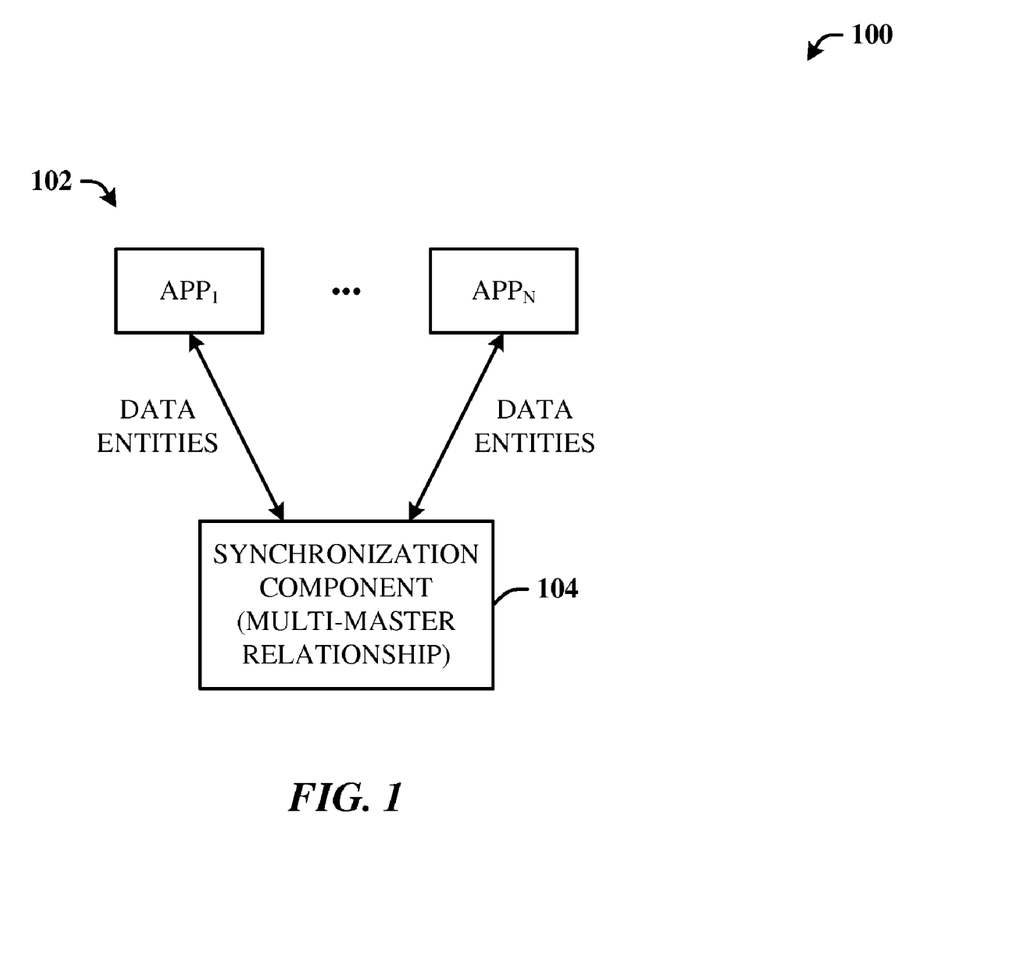
FIG. 1 illustrates a computer-implemented system for data synchronization in accordance with the disclosed architecture.

FIG. 1 illustrates a computer-implemented system 100 for data synchronization in accordance with the disclosed architecture. The system 100 includes a plurality of applications 102 (e.g., business) (denoted $APP_1, \ldots, APP_N$) for processing data entities associated with business transactions. A synchronization component 104 synchronizes changes in the data entities between the applications 102 according to a multi-master relationship.

In a business environment, rather than limiting the synchronization process to a single designated master, the system 100 functions to serve the applications, which can be business applications, in a master-master relationship such that when one application completes synchronization, another of the applications can then act as a master to complete synchronization of the desired data entities.

In a business application environment, the changes to the data entities can be reduced to snap-shot changes (for after-change results), delta changes (storing before and after change information), or long-running process changes.

Synchronization of the entities occurs in the background without requiring user interaction. However, this is not a requirement, and in one alternative implementation, the user can manually interact to initiate and oversee the synchronization process. Thus, users who are comfortable with this configuration can employ a user-initiated request for data transfer or synchronization between back-office accounting and POS applications.

Automatic synchronization can be based on system idle time. Synchronization can be started if the system is available so that the number of pending records to synchronize is minimized. A heuristic for automatic synchronization can include forced (or on-demand) synchronization if the system does not hit a pre-defined idle percentage.

Based on the synchronization start time, an application checks which of its data entities have changed between the applications and ensures that the right application is updated based on date/timestamp. If an entity is created or has been deleted, then such state information is stored in a change list and played across to the other applications. Once changes are made to an entity, the change is replayed to other applications and the entity is marked and removed from the change list so that the same entity is not re-executed during the next synchronization cycle.

If an application cannot synchronize (e.g., the service was not started, no connection to the database, etc.), then the application maintains its current change list in tact and attempts to reconnect and synchronize at the next synchronization cycle. The process of attempting to connect/re-connect occurs continuously in the background based on pre-set interval, for example, until connection succeeds and synchronization is complete.

Following is one example of an order in which integrated business entities can be synchronized: changes for all integrated entities (e.g., items, customers, suppliers and taxes) can be consolidated and arranged chronologically (the earliest timestamp executes first); creation of an entity is played to other applications based on where the entity was created; edition of the entity based on the latest timestamp; for an item, quantity changes outside the scope of transactions can be tracked separately; manual quantity adjustments for an item irrespective of the timestamp; item receipts in the POS; sale, return, and void transactions; e-commerce transactions; and Z reports—over/short and surcharge amounts postings.

Synchronization timing options provide a way for the user to configure when the service will run automatically. The user can choose to synchronize the data at any time based on a user-initiated request. Data will continue to accumulate until the user interacts through a user interface (UI) and initiates the request to start the synchronization.

As previously indicated, automatic data synchronization allows an application to automatically start the data synchronization process based on pre-defined heuristics that can include system utilization (e.g., percentage of CPU idle time), number of entities to synchronize, etc. This option can be set by default.

The status of the synchronization service is known at any given point in time and the user can obtain and view the details of the service (e.g., errors).

Figure 2:
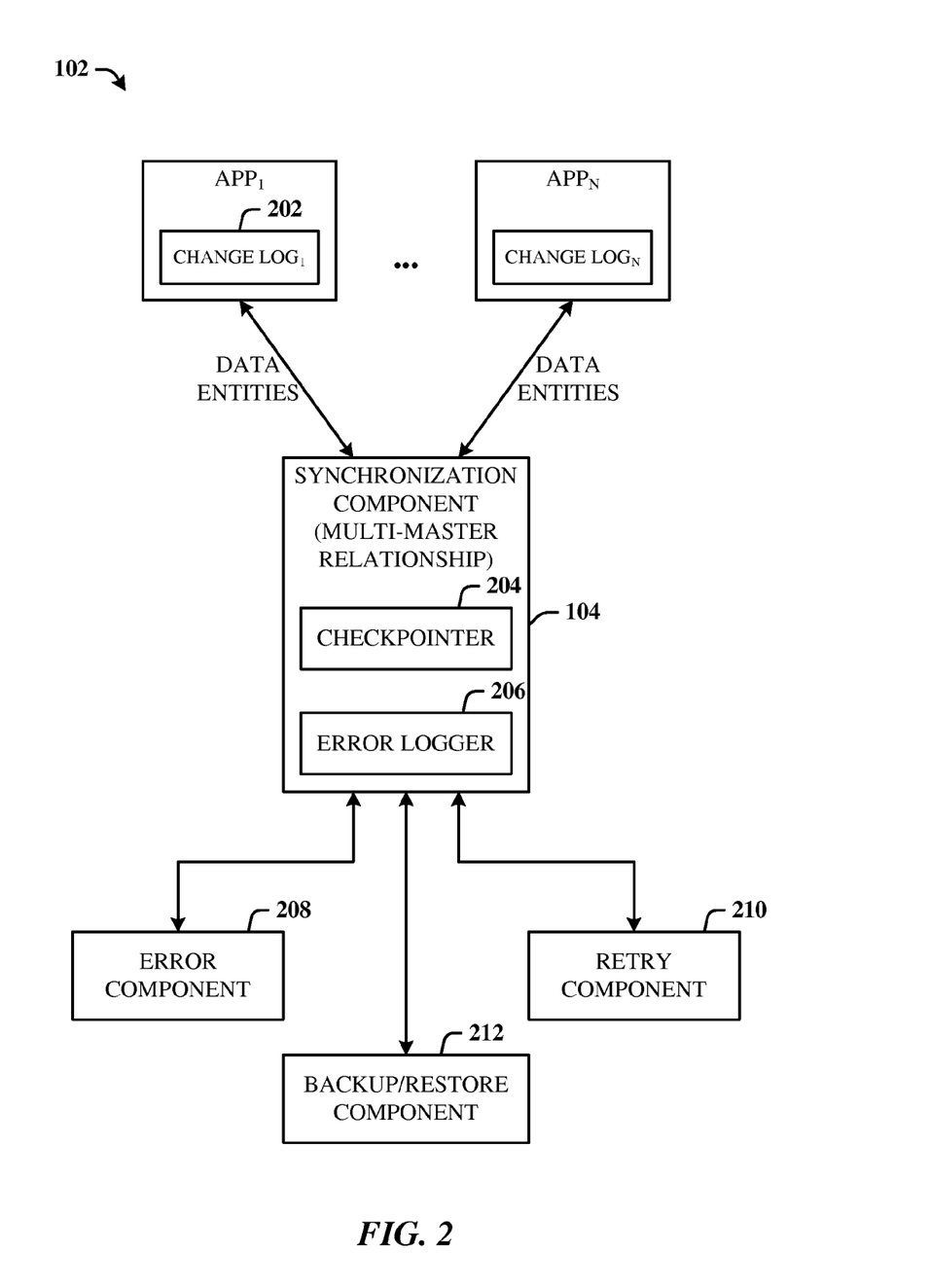
FIG. 2 illustrates a more detailed alternative system for data synchronization.

FIG. 2 illustrates a more detailed alternative system 200 for data synchronization. Here, each application 102 includes a corresponding change log(ger) 202 (denoted $CHANGE\ LOG_1, \ldots, CHANGE\ LOG_N$) for logging (recording) changes to its data entities in anticipation of the synchronization process.

The synchronization component 104 can include a synchronization checkpointer 204 and a synchronization error logger 206. The checkpointer 204 maintains checkpoints for each of the applications participating in a synchronization process. The synchronization error logger 206 is a table that stores all changes in the data entities that failed synchronization. Thus, the table of failed changes can be reported as well as re-tried when such error changes can be re-tried.

The system 200 further can include an error component 208 and a retry component 210. The error component 208 generates an error based on a failed synchronization of a data entity. The retry component 210 automatically replays a transaction to resolve a synchronization error for the failed data entity. As previously described the error logger 206 maintains the synchronization errors encountered.

The sync error log table is processed every time a change has finished synchronization. If the synchronization failed, this change and also the source entity that caused this failure, if available, are both logged. If the synchronization is successful, a check is made for a record of the failed synchronization of this same entity and type changes in a previous cycle (if it is not a transaction type of change), and if so, these will be removed. A check is also made if this successfully synchronized entity is the cause of any existing failed entry. If so, the failed the entry status is updated to ready-to-retry.

When the change list is loaded from the two applications, the ready-to-retry error log is also loaded, both of which are processes as a normal operation log. An entity synchronization error will be automatically tried to recover.

A backup/restore component 212 is provided through the algorithm such that when a restore occurs, the application will acquire a new unique application ID (e.g., GUID) (which is used in the OperationLog as ChangeInitiator). Additionally, the SyncCheckPoint table is adjusted to the latest common known checkpoint to participating applications. With this, changes can be identified that need to be replayed thereby supporting the backup/restore case.

Although shown as external to the synchronization component 104 the error component 208 and the retry component 210 can be internal thereto. Alternatively, the checkpointer 204 and the error logger 206 can be external to the synchronization component 104. In other words, these can be implemented internal or external in the desired configuration.

Figure 3:
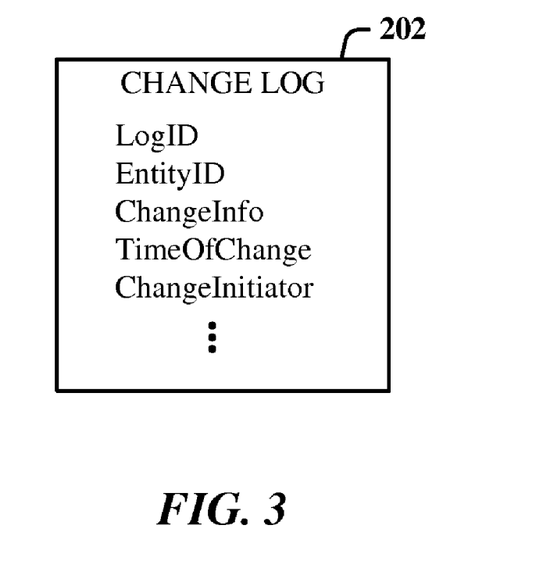
FIG. 3 illustrates an exemplary change log for recording changes that are to be synchronized.

FIG. 3 illustrates an exemplary change log 202 for recording changes that are to be synchronized. As shown, the change log 202 (also referred to as OperationLog) entry can be composed of change information such as a LogID, EntityID, ChangeInfo, TimeOfChange, and ChangeInitiator. ChangeInfo can be simply a type of change such as snap-shot, and/or it can also include a reference to the full change information for a delta transaction type of change. ChangeInitiator is an attribute that indicates the source of the change. This attribute is utilized so that a change that occurred due to synchronization activities will not cause a recurrent change loop.

Figure 4:
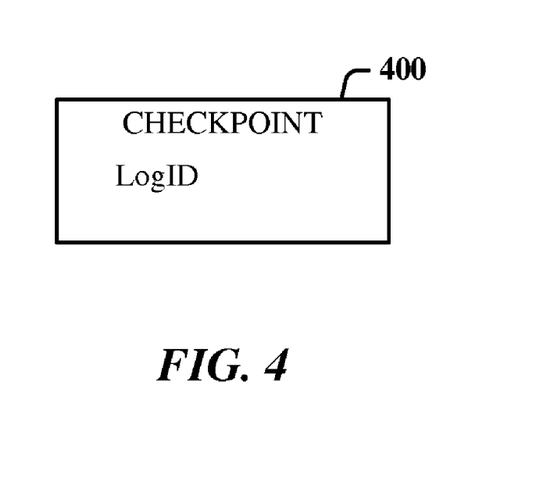
FIG. 4 illustrates an exemplary checkpoint.

FIG. 4 illustrates an exemplary checkpoint 400. The synchronization service maintains checkpoints (SyncCheckPoint) for the changes that are done for each synchronization participant system (or application). The checkpoint 400 is the LogID of the change log 202 of FIG. 3, which is marked by this checkpoint 400.

Figure 5:
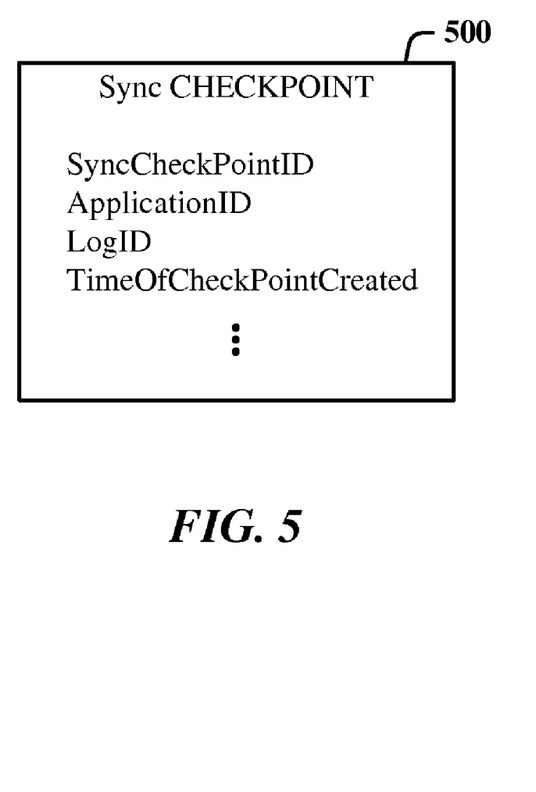
FIG. 5 illustrates an exemplary synchronization checkpoint generated during a synchronization process.

FIG. 5 illustrates an exemplary synchronization checkpoint 500 generated during a synchronization process. The synchronization checkpoint 500 (also denoted SyncCheckPoint) is composed of a SyncCheckPointID, ApplicationID, LogID, TimeOfCheckPointCreated, etc. The ApplicationID indicates the application to which this SyncCheckPoint points. Once a change log(e.g., change log 202 of FIG. 3) is processed by the synchronization service, its LogID will be marked as new in the SyncCheckPoint so that the change log will not be processed again in the future.

Figure 6:
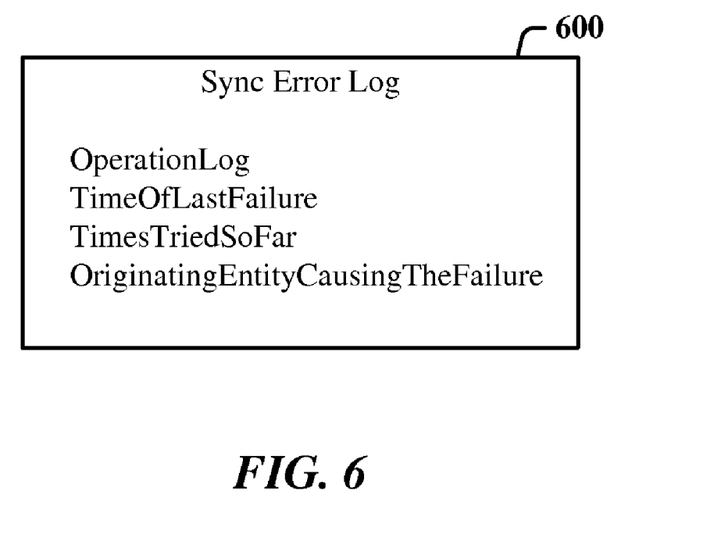
FIG. 6 illustrates an exemplary synchronization error log for automatic retry service.

FIG. 6 illustrates an exemplary synchronization error log 600 for automatic retry service. To support automatic retry logic for synchronization errors, the synchronization service includes the synchronization error log 600 (also denoted as SyncErrorLog) as a table that stores the changes that failed synchronization so that the failed changes can be reported as well as re-tried when such error changes can be retried. The synchronization error log 600 contains the change log that failed during synchronization, the time of the last failure (TimeofLastFailure), the number of times tried up to this point in time (TimesTriedSoFar), and the originating entity that caused the failure, if it exists (OriginatingEntityCausingTheFailure).

Figure 7:
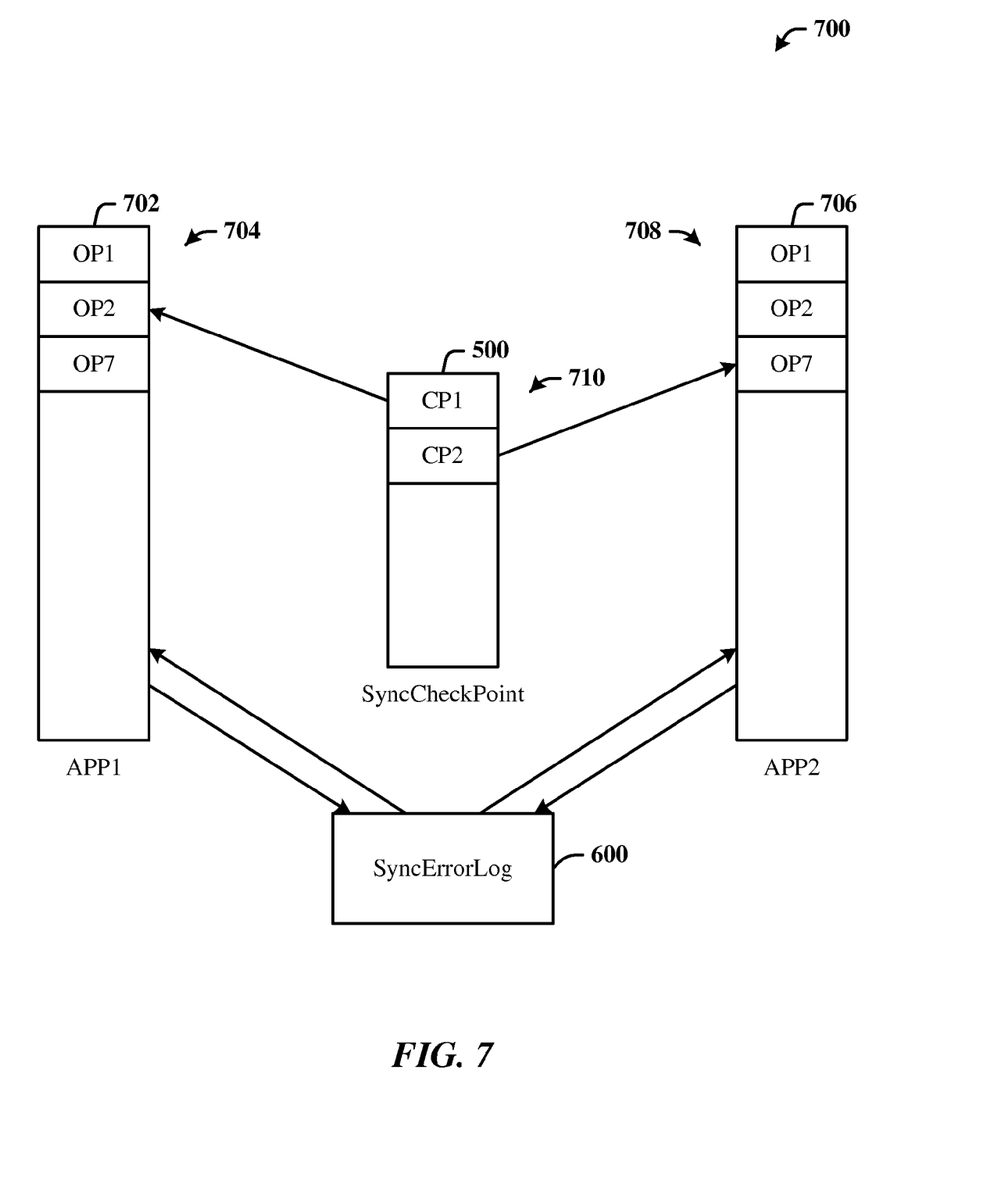
FIG. 7 illustrates a flow diagram of a synchronization process between two business applications.

FIG. 7 illustrates a flow diagram of a synchronization process 700 between two business applications. A simplified model which remains powerful and can be used in most real world scenarios is that one of the participating business applications contains both snap-shot changes and delta changes, while the other contains only snap-shot changes. The disclosed architecture also applies to scenarios where multiple applications participate in the synchronization process. Here, a first application 702 includes several operations 704 (denoted OP1, OP2, and OP7) recorded as changes to data entities for use in a synchronization process. Similarly, a second application 706 includes several operations 708 (denoted OP1, OP2, and OP7) recorded as changes to the same data entities for use in the synchronization process.

The synchronization service maintains the checkpoints 710 for the applications (702 and 706) (denoted CP1 and CP2) in the SyncCheckPoint table 500. The SyncErrorLog 600 provides the automatic retry logic for resolving synchronization errors at a suitable time.

Figure 8:
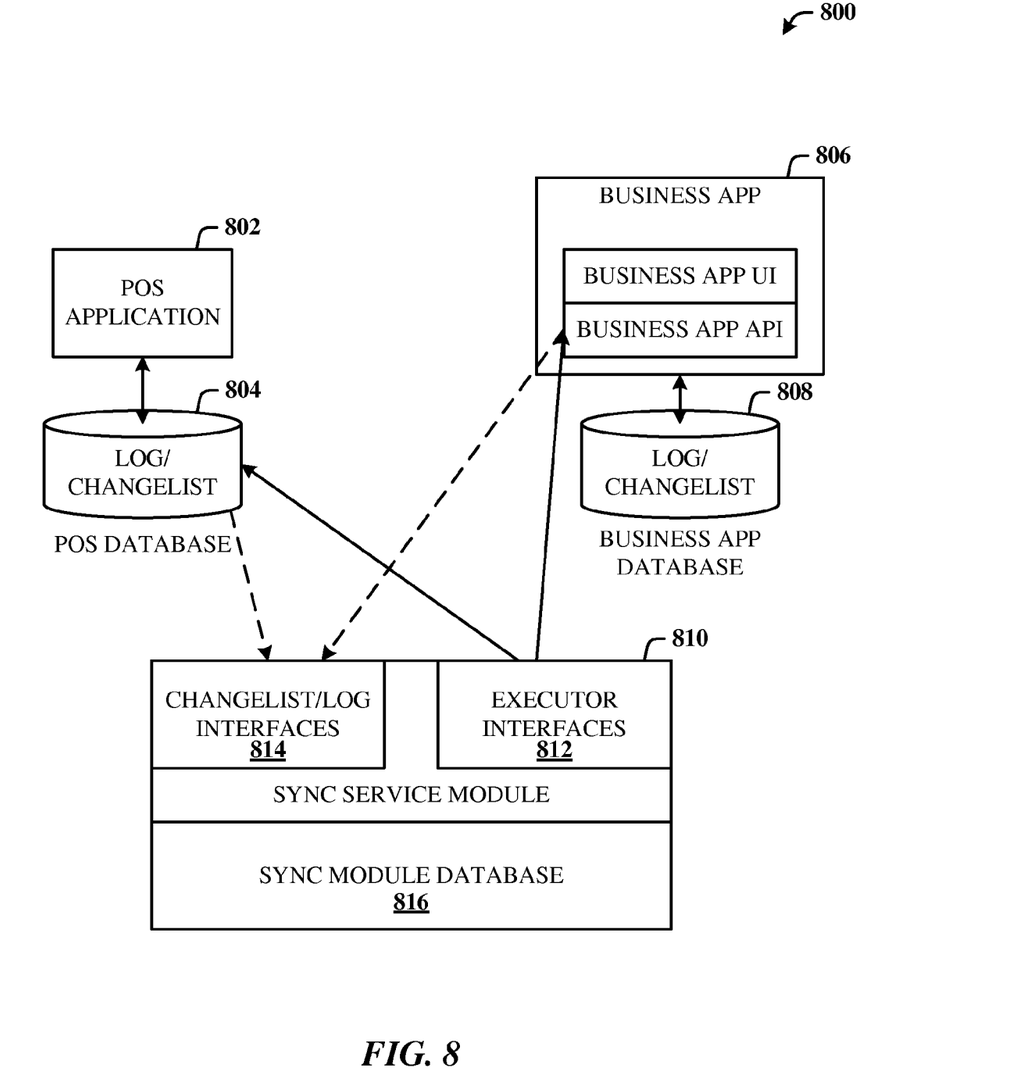
FIG. 8 illustrates an application of the data synchronization architecture for a small business system.

FIG. 8 illustrates an application of the data synchronization architecture for a small business system 800. The business can include a POS application 802 and associated POS database 804, and a back-office business application 806 (e.g., accounting) and associated back-office application database 808. The back-office application 806 can include a business application UI and a business application API. A synchronization service module 810 provides the synchronization service to the participating applications (e.g., applications 802 and 806). The service module 810 includes executor interfaces 812 and change list/log interfaces 816. The executor interfaces 812 interact with the back-office business application API and the change list/log POS database 804 to provide this information to the change list/log interfaces 814 of the service module 810.

In other words, the functionalities of the service module 810 include taking changes from POS application 802 and synchronizing the changes to the back-office business application 806. Similarly, service module 810 takes changes from the back-office business application 806 and synchronizes the changes to POS application 802. The changes include CUD (create, update, delete) operations on various business entities including, but not limited to: Item, Customer, Supplier, Tax, Transaction, Item Receipt, etc.

The changes that can be applied to a business entity are the changes desired to be synchronized between business applications. The following changes can be performed to either the snap-shot change or the delta change and include the following: creation, for when a business entity is created (a type of snap-shot change, e.g., a new customer is added into a CRM (customer relationship management) application, or a new inventory item is added into an inventory management application); deletion, for when a business entity is deleted (the reverse action, but similar to creation); update, for when a business entity's non-delta property(s) are changed (a type of snap-shot change, e.g., a customer email address is changed); and transaction, for when a business entity's delta property is changed. The transaction is a type of delta change, for example an inventory item's quantity is adjusted, or a sales transaction occurred which reduces multiple inventory item quantities and reduces the inventory asset value.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
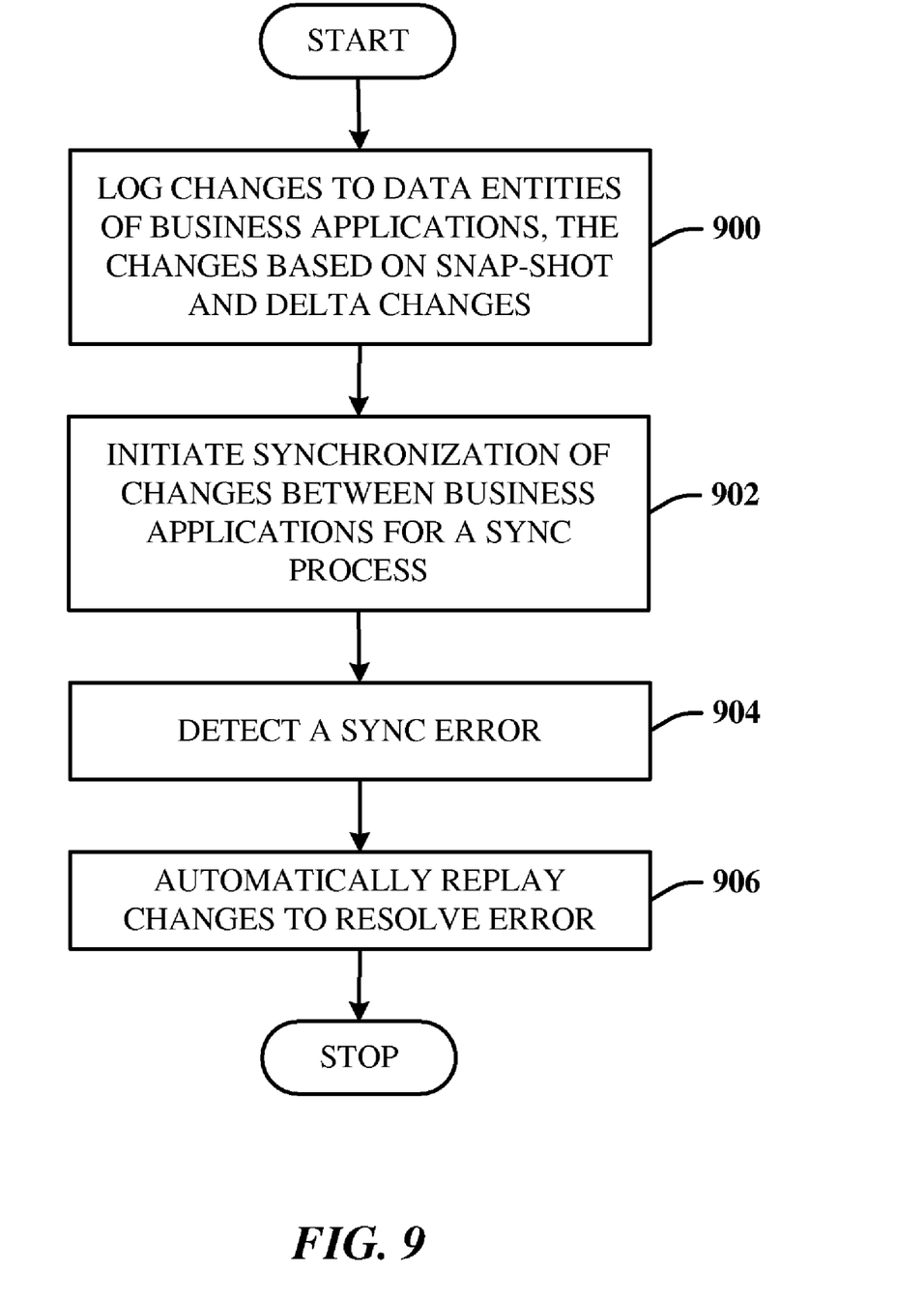
FIG. 9 illustrates a method of a computer-implemented method of automatic retry of synchronization errors.

FIG. 9 illustrates a method of a computer-implemented method of automatic retry of synchronization errors. At 900, changes to data entities of business applications are logged, the changes based on snap-shot changes and delta changes. At 902, synchronization of the changes is initiated between the business applications for a synchronization process. At 904, a synchronization error is detected. At 906, the changes are automatically replayed to resolve the error.

Figure 10:
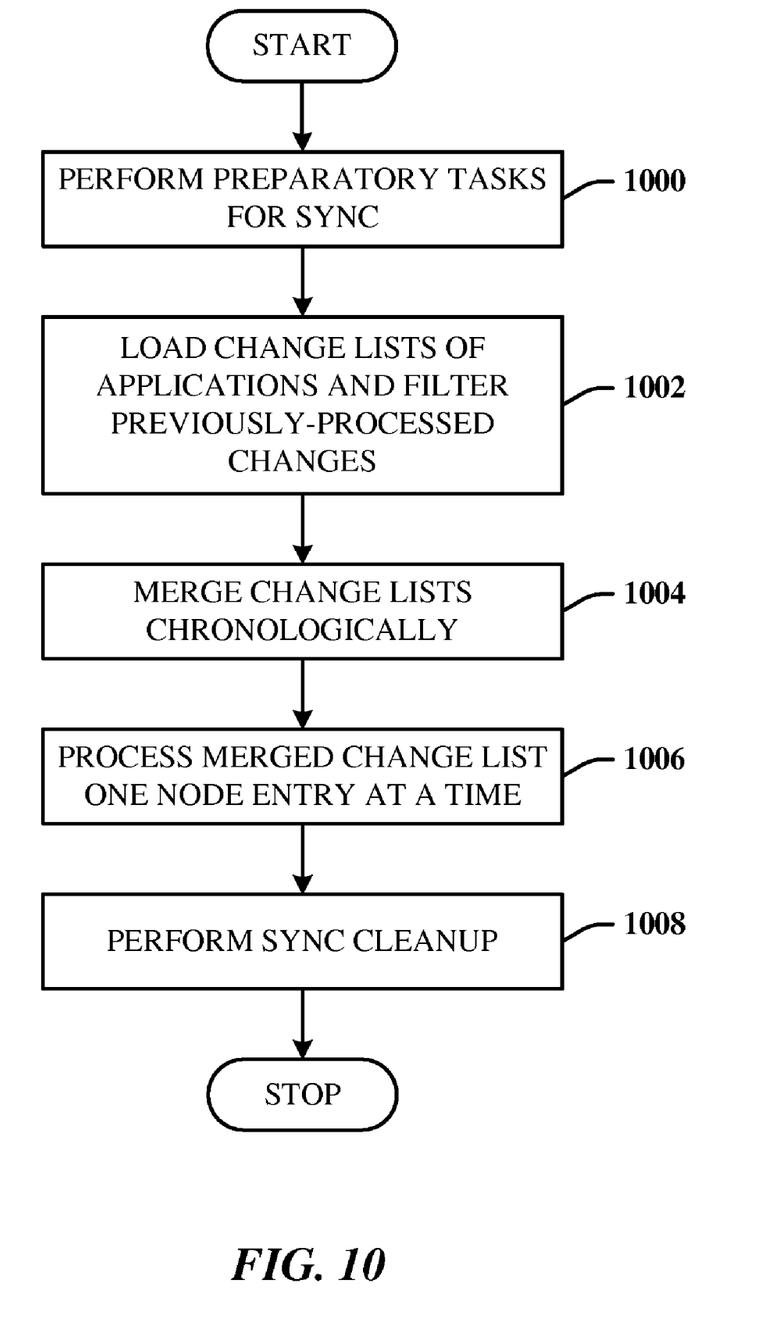
FIG. 10 illustrates a more detailed method of synchronizing data.

FIG. 10 illustrates a more detailed method of synchronizing data. At 1000, tasks are performed to prepare for synchronization. These can include checking if this is an initial synchronization, or if backup/restore happened to any of the participant systems. At 1002, the change lists (or OperationLogs) of the applications are loaded. In this step, the changes previously processed by the synchronization service are filtered out. At 1004, the change lists from different applications are merged chronologically. In this step, optimizations can be performed, for example, if multiple updates occur on the same data entity, the latest will win and previous update changes can be marked to avoid processing (or NotNeedTo-Process). At 1006, the merged change list nodes are processed one-by-one. At 1008, synchronization cleanup is performed. For example, if one of the applications is the master, all other systems can be forced into synchronization with the master at this time.

Figure 11:
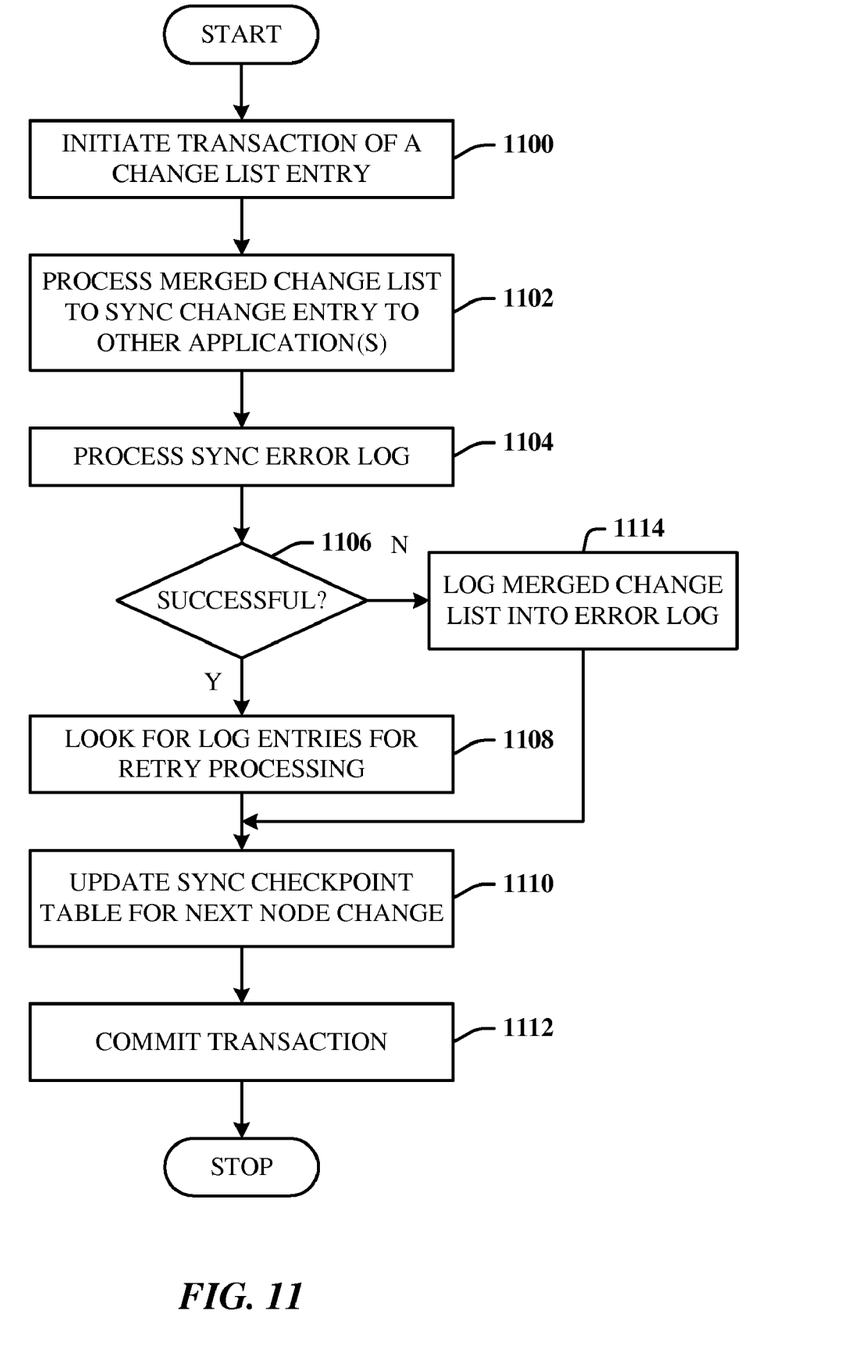
FIG. 11 illustrates a method of processing changes of the merged change list.

FIG. 11 illustrates a method of processing changes of the merged change list. At 1100, a transaction of a change list entry is initiated. At 1102, the merged change list is processed to synchronize the change to the other application(s). At 1104, the synchronization error log is processed. At 1106, if synchronization of the change to the other application(s) is successful, flow is to 1108 to look for entries in the synchronization error log that can now be retried. This can be because this entry or even other entries may no long be valid and can be removed directly. At 1110, the sync checkpoint table is updated in preparation for processing the next node change. At 1112, the transaction is then committed. At 1106, if synchronization of the change to the other application(s) fails, flow is to 1114 where the merged changed list (or Operation-Log) is logged into the synchronization error log.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
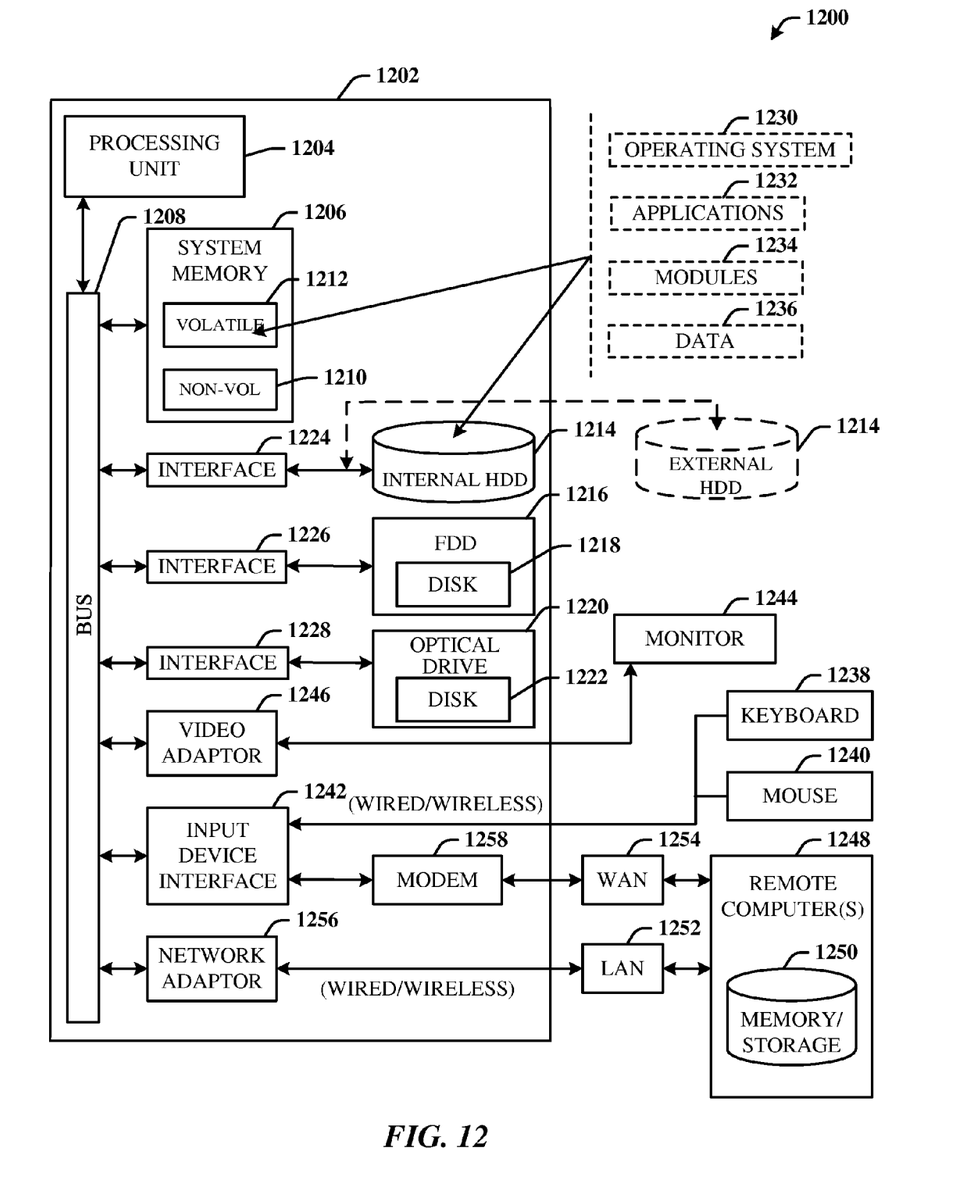
FIG. 12 illustrates a block diagram of a computing system operable to execute the disclosed data synchronization architecture.

Referring now to FIG. 12, there is illustrated a block diagram of a computing system 1200 operable to execute the disclosed data synchronization architecture. In order to provide additional context for various aspects thereof, FIG. 12 and the following discussion are intended to provide a brief, general description of a suitable computing system 1200 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202 having a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 can include non-volatile memory (NON-VOL) 1210 and/or volatile memory 1212 (e.g., random access memory (RAM)). A basic input/output system (BIOS) can be stored in the non-volatile memory 1210 (e.g., ROM, EPROM, EEPROM, etc.), which BIOS contains the basic routines that help to transfer information between elements within the computer 1202, such as during start-up. The volatile memory 1212 can also include a high-speed RAM such as static RAM for caching data.

The computer 1202 further includes an internal hard disk drive (HDD) 1214 (e.g., EIDE, SATA), which internal HDD 1214 may also be configured for external use in a suitable chassis, a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as a DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1212, including an operating system 1230, one or more application programs 1232, other program modules 1234, and program data 1236. The one or more application programs 1232, other program modules 1234, and program data 1236 can include the applications 102 and synchronization component 104 of FIG. 1, the change logs 202, checkpointer 204, error logger 206, error component 208, retry component 210 and backup/restore component 212 of FIG. 2, checkpoint 400, sync checkpoint 500, sync error log 600, the sync service module 810 and interfaces (812 and 814). POS application and, business application and subparts 806, for example.

All or portions of the operating system, applications, modules, and/or data can also be cached in the volatile memory 1212. It is to be appreciated that the disclosed architecture can be implemented with various commercially available operating systems or combinations of operating systems.

A user can enter commands and information into the computer 1202 through one or more wire/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, etc.

A monitor 1244 or other type of display device is also connected to the system bus 1208 via an interface, such as a video adaptor 1246. In addition to the monitor 1244, a computer typically includes other peripheral output devices (not shown), such as speakers, printers, etc.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, is connected to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for data synchronization, comprising:
    a plurality of applications for processing data entities associated with business transactions;
    a synchronization component for synchronizing changes in the data entities between the applications according to a multi-master relationship such that one application completes synchronization of associated data entities, an other application of the applications then completes synchronization of other data entities associated with the other application; and
    a processor that executes computer-executable instructions associated with at least one of the plurality of applications, or the synchronization component.

2. The system of claim 1, wherein the applications are business applications.

3. The system of claim 1, wherein the changes include at least one of snap-shot changes, delta changes, or long-running process changes.

4. The system of claim 1, wherein each application includes a change logger for recording a change in a data entity of the application that should be synchronized.

5. The system of claim 4, wherein the change logger includes a change initiator attribute that indicates a source of a change.

6. The system of claim 1, further comprising an error component for generating an error based on a failed synchronization of the data entities.

7. The system of claim 1, wherein the synchronization component includes a synchronization checkpointer for maintaining checkpoints for each of the applications participating in a synchronization process.

8. The system of claim 1, further comprising a synchronization error log for tracking synchronization failures associated with the data entities.

9. The system of claim 1, further comprising a retry component for automatically replaying a transaction to resolve a synchronization error.

10. The system of claim 1, wherein the changes of one of the applications include snap-shot changes and delta changes, and the changes of another of the applications include snap-shot changes.

11. A computer-implemented method of synchronizing data, comprising acts of:
  logging changes to data entities of business applications in logs, the changes based on snap-shot changes and delta changes;
  merging the logs of the changes from the applications chronologically into a merged change list;
  initiating synchronization of the changes between the business applications for a synchronization process using the merged change list;
  detecting a synchronization error;
  automatically replaying the changes to resolve the error; and
  utilizing a processor that executes instructions stored in memory to perform at least one of the acts of logging, merging, initiating, detecting, or automatically replaying.

12. The method of claim 11, further comprising synchronizing a long-running process change based on the snap-shot changes and delta changes.

13. The method of claim 11, further comprising maintaining checkpoints in the business applications for the changes that are to be synchronized and updating the checkpoints during the synchronization process.

14. The method of claim 11, further comprising tagging an operation log to prevent re-processing of the log.

15. The method of claim 11, further comprising logging the synchronization error for replay.

16. The method of claim 11, further comprising removing duplicate changes to a same entity from the merged change list by processing only a latest change to the entity.

17. The method of claim 11, further comprising resolving errors resulting from the detected error.

18. The method of claim 11, further comprising synchronizing new changes to the data entities to a recently-restored system during a backup-and-restore operation for a non-backup-and-restore application.

19. A computer-implemented system, comprising:
  computer-implemented means for logging changes to data entities of business applications, the changes based on snap-shot changes and delta changes;
  computer-implemented means for initiating synchronization of the changes between the business applications for a synchronization process;
  computer-implemented means for merging the logged changes of the applications;
  computer-implemented means for processing the merged changed list;
  computer-implemented means for detecting a synchronization error;
  computer-implemented means for automatically replaying the changes to resolve the error; and
  processor means that executes computer-executable instructions associated with at least the means for logging, initiating, merging, processing, detecting, or automatically replaying.

* * * * *